United States Patent
Frysz et al.

(10) Patent No.: US 7,465,521 B2
(45) Date of Patent: Dec. 16, 2008

(54) NICKEL-BASED ALLOYS AS POSITIVE ELECTRODE SUPPORT MATERIALS IN ELECTROCHEMICAL CELLS CONTAINING NONAQUEOUS ELECTROLYTES

(75) Inventors: Christine Frysz, Columbia, MD (US); W. Richard Brown, Clarence Center, NY (US); Peter A. Kreidler, Oakfield, NY (US); Sally Ann Smesko, North Tonawanda, NY (US); Karen Nuwer, Orchard Park, NY (US)

(73) Assignee: Greatbatch Ltd., Clarence, NY (US)

( * ) Notice: Subject to any disclaimer, the term of this patent is extended or adjusted under 35 U.S.C. 154(b) by 813 days.

(21) Appl. No.: 11/007,534

(22) Filed: Dec. 8, 2004

(65) Prior Publication Data

US 2006/0121354 A1 Jun. 8, 2006

(51) Int. Cl.
*H01M 4/66* (2006.01)
*C22C 38/38* (2006.01)
*C22C 19/05* (2006.01)
*C22C 30/00* (2006.01)

(52) U.S. Cl. .................. 429/245; 428/57; 428/452; 428/584.1; 428/588

(58) Field of Classification Search ............ 420/57, 420/452, 584.1, 588; 429/245
See application file for complete search history.

(56) References Cited

U.S. PATENT DOCUMENTS

| 4,176,214 A | 11/1979 | Klinedinst et al. |
| 4,565,751 A | 1/1986 | Faust et al. |
| 5,294,502 A | 3/1994 | Shackle et al. |
| 5,340,669 A | 8/1994 | Chaloner-Gill et al. |
| 5,455,127 A | 10/1995 | Olsen et al. |
| 5,478,670 A * | 12/1995 | Hayasaka et al. ............ 429/175 |
| 5,776,635 A | 7/1998 | Gan et al. |
| 6,306,544 B1 * | 10/2001 | Frysz et al. .................. 429/233 |

FOREIGN PATENT DOCUMENTS

JP 9-22701 * 1/1997

* cited by examiner

*Primary Examiner*—Stephen J. Kalafut
(74) *Attorney, Agent, or Firm*—Michael F. Scalise

(57) ABSTRACT

Nickel-based alloys are provided for use as a positive electrode current collector in a solid cathode, nonaqueous liquid electrolyte, alkali metal anode active electrochemical cell. The nickel-based alloys are characterized by chemical compatibility with aggressive cell environments, high corrosion resistance and resistance to fluorination and passivation at elevated temperatures, thus improving the longevity and performance of the electrochemical cell. The cell can be of either a primary or a secondary configuration.

18 Claims, 14 Drawing Sheets

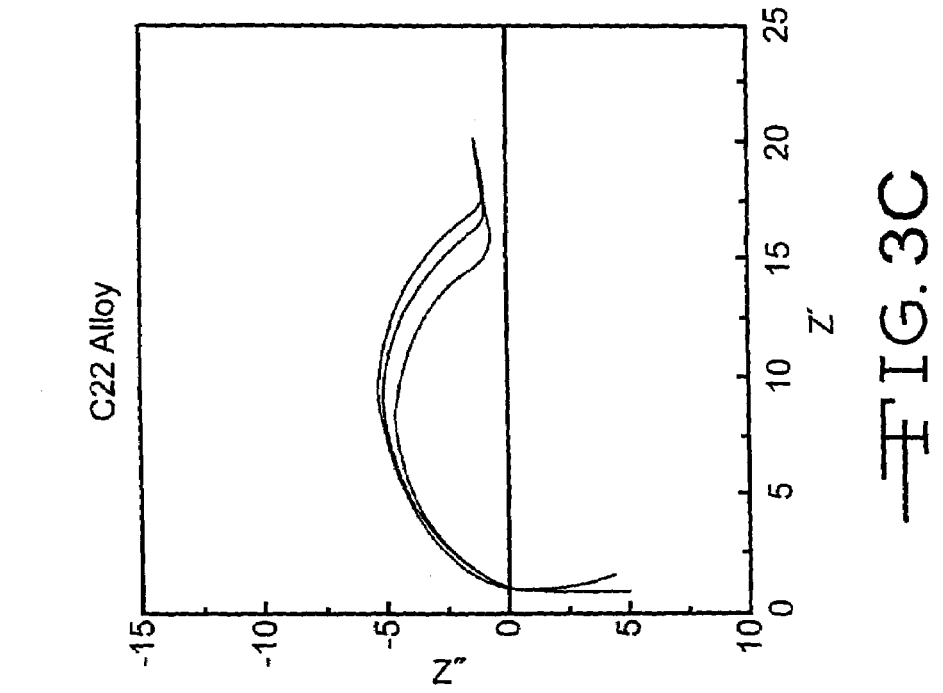
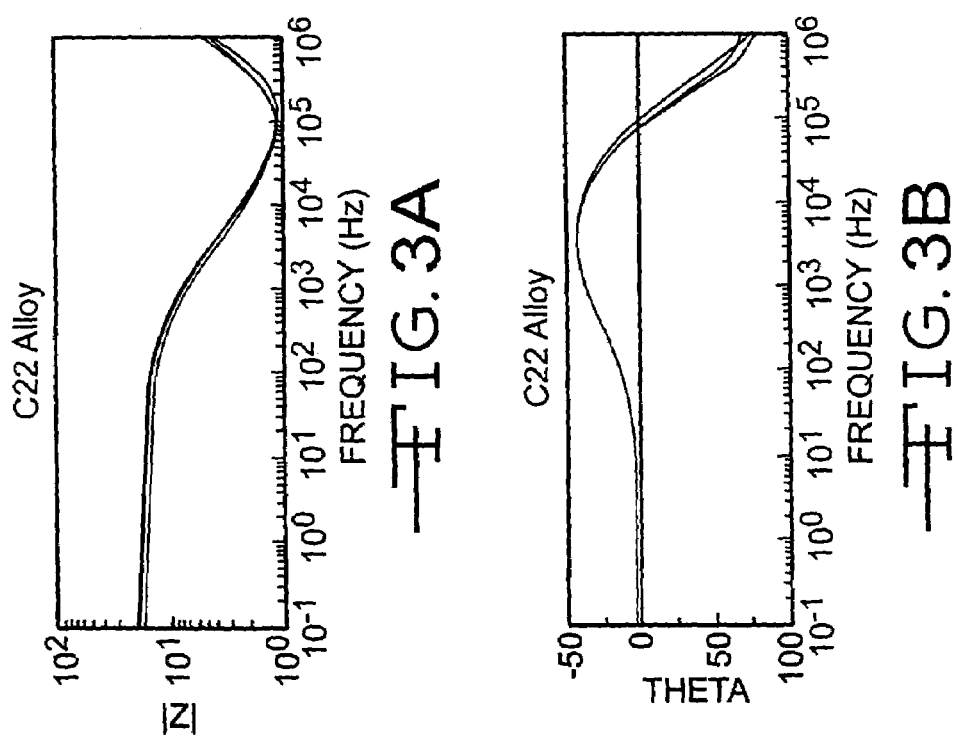
FIG. 3A
FIG. 3B
FIG. 3C

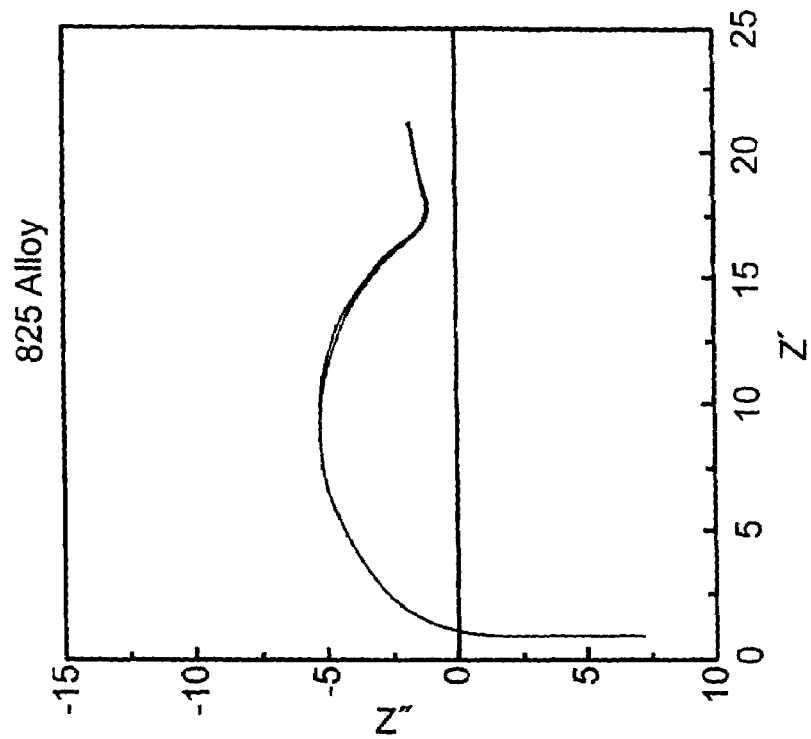
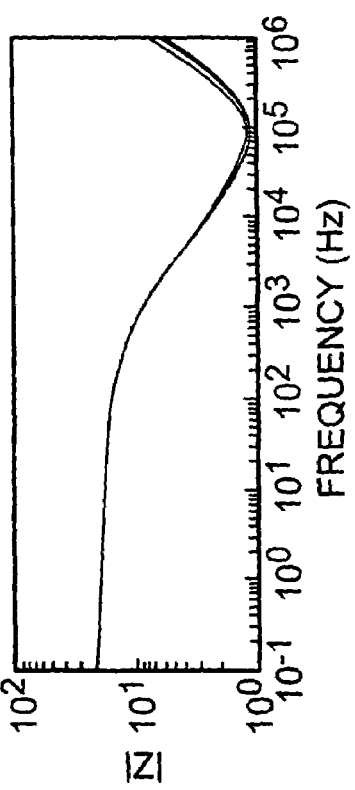
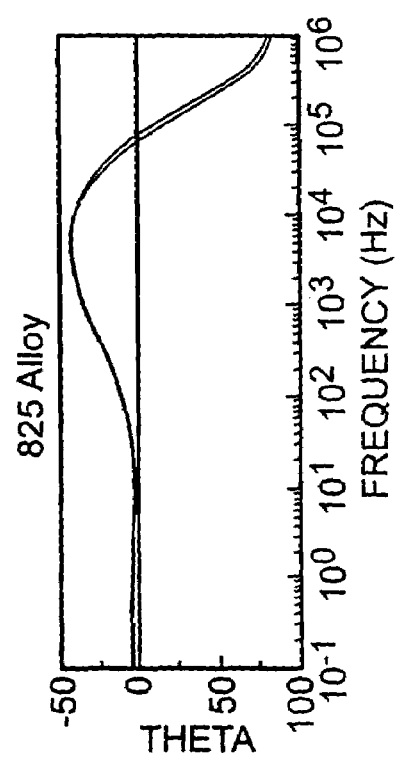
FIG. 5A
FIG. 5B
FIG. 5C

200 Series Nickel – 800 grit
finish – 5000X

200 Series Nickel – Exposed
to $LiBF_4$/GBL during Cyclic
Polarization test – 5000X 600 Alloy - 800 grit
finish - 5000X 600 Alloy - Exposed
to $LiBF_4$/GBL during Cyclic
Polarization test - 5000X 625 Alloy – 800 grit
finish – 5000X 625 Alloy – Exposed
to $LiBF_4$/GBL during Cyclic
Polarization test – 5000X C22 Alloy - 800 grit
finish - 5000X C22 Alloy - Exposed
to LiBF$_4$/GBL during Cyclic
Polarization test - 5000X 622 Alloy - 800 grit
finish - 5000X 622 Alloy - Exposed
to $LiBF_4$/GBL during Cyclic
Polarization test - 5000X 686 Alloy - 800 grit
finish - 5000X 686 Alloy - Exposed
to $LiBF_4$/GBL during Cyclic
Polarization test - 5000X C276 Alloy - 800 grit finish - 5000X C276 Alloy - Exposed to $LiBF_4$/GBL during Cyclic Polarization test - 5000X 825 Alloy - 800 grit
finish - 5000X 825 Alloy - Exposed
to LiBF$_4$/GBL during Cyclic
Polarization test - 5000X 25-6 Mo Alloy - 800 grit
finish - 5000X 25-6 Mo Alloy - Exposed
to $LiBF_4$/GBL during Cyclic
Polarization test - 5000X

NICKEL-BASED ALLOYS AS POSITIVE ELECTRODE SUPPORT MATERIALS IN ELECTROCHEMICAL CELLS CONTAINING NONAQUEOUS ELECTROLYTES

BACKGROUND OF THE INVENTION

1. Field of the Invention

The present invention generally relates to a positive electrode support material in electrochemical cells containing nonaqueous electrolytes and, more specifically, to nickel-based alloys as positive electrode current collector materials.

2. Prior Art

Solid cathode, liquid organic electrolyte, alkali metal anode electrochemical cells or batteries are used in applications ranging from power sources for implantable medical devices to down-hole instrumentation in oil/gas well drilling. Typically, the cell is comprised of a casing housing a positive electrode comprised of a cathode active material, material to enhance conductivity, a binder material, and a current collector material; a negative electrode comprised of active material such as an alkali metal and a current collector material; a nonaqueous electrolyte solution that includes an alkali metal salt and an organic solvent system; and a separator material isolating the electrodes from each other. Such a cell is described in greater detail in U.S. Pat. No. 4,830,940 to Keister et al., which is assigned to the assignee of the present invention and incorporated herein by reference.

The positive electrode current collector serves several functions. First, it acts as a support for the cathode active material. Secondly, the positive current collector conducts the flow of electrons between the cathode active material and the positive cell terminal. Consequently, the material selected for this function affects the longevity and performance of the electrochemical cell into which it is fabricated. For one, the positive electrode current collector must maintain chemical stability and mechanical integrity in corrosive electrolytes throughout the anticipated useful life of the cell. In addition, as applications become more demanding on electrochemical cells containing nonaqueous electrolytes (including increased shelf life and extended long term performance), the availability of corrosion resistant materials suitable for these applications becomes more limited. For example, the availability of materials capable of operating or maintaining chemical stability at elevated temperatures is limited. Elevated temperatures may be encountered either during storage or under operating conditions (for example, down-hole in well drilling), or during autoclave sterilization of an implantable medical device powered by the electrochemical cell (Thiebolt III and Takeuchi, 1989, Progress in Batteries & Solar Cells 8:122-125).

In that respect, the prior art has developed various corrosion resistant materials useful for positive electrode current collectors. However, certain of these materials corrode when exposed to elevated temperatures of about 72° C. or higher, or when exposed to operating conditions in aggressive cell environments that can compromise surface passivity. Also, at elevated temperatures the chemical integrity of the positive electrode current collector may depend on the specific cathode active material. One particularly vexing combination is when fluorinated carbon ($CF_x$) is contacted to a current collector of titanium. It is known that titanium reacts with species present within the internal cell environment to undesirably increase cell impedance by fluorination and excessive passivation of the current collector interface (Fateev, S. A., Denisova, O. O., I. P. Monakhova et al., Zashchita Metallov, Vol. 24, No. 2, pp. 284-287, 1988, transl.). The kinetics of this process are temperature dependent. At elevated temperatures, excessive passivation may occur quite rapidly (for example, at 100° C., the reaction requires less than 10 days).

Other current collector alloys used to fabricate positive electrode current collectors have been described in the art. For example, highly alloyed chromium-containing stainless steel materials are described in Japanese patent publications Nos. 18647 and 15067. However, the ferritic stainless steel material disclosed in publication No. 15067 requires costly melting procedures, such as vacuum melting, to limit the alloy to the cited carbon and nitrogen levels.

Highly alloyed nickel-containing ferritic stainless steels, which provide superior corrosion resistance, particularly, when elevated temperature storage and performance is required, are disclosed in U.S. Pat. No. 5,114,810 to Frysz et al. This patent is assigned to the assignee of the present invention and incorporated herein by reference. Frysz et al. disclose alloyed nickel-containing ferritic materials having less than 10% nickel, by weight. In addition to the relatively small quantity of nickel, the alloy contains, by weight, 28% to 30% chromium and 3.5% to 4.2% molybdenum; or 27% to 29% chromium and 2% to 3% molybdenum. In some battery environments, there may be other alloy materials that provide superior performance. In that respect, use of such alloyed low nickel ferritic stainless steels is limited in several respects. Chief among them is that the alloy is not readily available in thicknesses typically required for use as a current collector, and developing a commercial source has proven difficult. Current collectors are preferably thin to permit increased volumetric and gravimetric energy density, as well as to permit increased surface area per volume for rapid discharge at high current densities.

Therefore, the present invention is directed to providing a positive electrode current collector material that exhibits chemical compatibility with aggressive cell environments; provides high corrosion resistance, but does not develop excessive passivation in the presence of fluorinated active materials such as fluorinated carbons, and thereby maintains its inherent high interfacial conductivity; provides resistance to surface activation by material handling or mechanical means; and can be manufactured in the required form and thicknesses.

Nickel-based alloys according to the present invention offer the characteristics required of such positive current collectors. This class of metals also offers other advantages, especially when used in cells for implantable medical devices. Typically, the power source of an implantable medical device contains current collectors of wrought metal stock in sheet or foil form made by convenient and economical chemical milling/photoetching processes. In contrast to the previously described relatively costly prior art fabrication processes for high chromium ferritic alloys (Japanese patent publication Nos. 18647 and 15067), chemical milling/photo etching these processes readily fabricate the present nickel-based alloy current collectors.

Even in the family of nickel-based alloys, however, selection is limited. Certain elemental constituents, especially copper, molybdenum and tungsten, are of vital importance in maximizing corrosion resistance. Also, chromium improves the formation of corrosion resistant passive surface films in the presence of oxygen. Silicon may also promote protective oxide formation at high corrosion potentials. Thus, the total amount of copper, silicon, chromium, molybdenum and/or tungsten present in a particular nickel-based alloy is a primary determinant to the suitability of that alloy as a current collector. Consequently, there are only a handful of acceptable compositions among available metals and alloys that remain practically corrosion-free in certain demanding cell environments; high chromium ferritic stainless steels are one class and selected nickel-based alloys are another.

SUMMARY OF THE INVENTION

The present invention, therefore, relates to a novel alloyed material used to fabricate positive electrode current collectors for solid cathode, liquid organic electrolyte, and alkali metal electrochemical cells. The present nickel-based alloys provide high corrosion resistance, particularly where elevated temperature storage and/or discharge performance are required or when long term storage at a broad temperature range is needed. This provides for increased cell longevity relative to other positive electrode current collector materials.

These and other aspects of the present invention will become more apparent to those skilled in the art by reference to the following description and to the appended drawings.

BRIEF DESCRIPTION OF THE DRAWINGS

FIGS. 3A to 5C present the AC impedance spectra recorded under open circuit conditions at ambient temperature for Li/SVO cells activated with an electrolyte composed of 1M LiPF$_6$ in PC/DME (50/50).

DETAILED DESCRIPTION OF THE INVENTION

Figure 1:
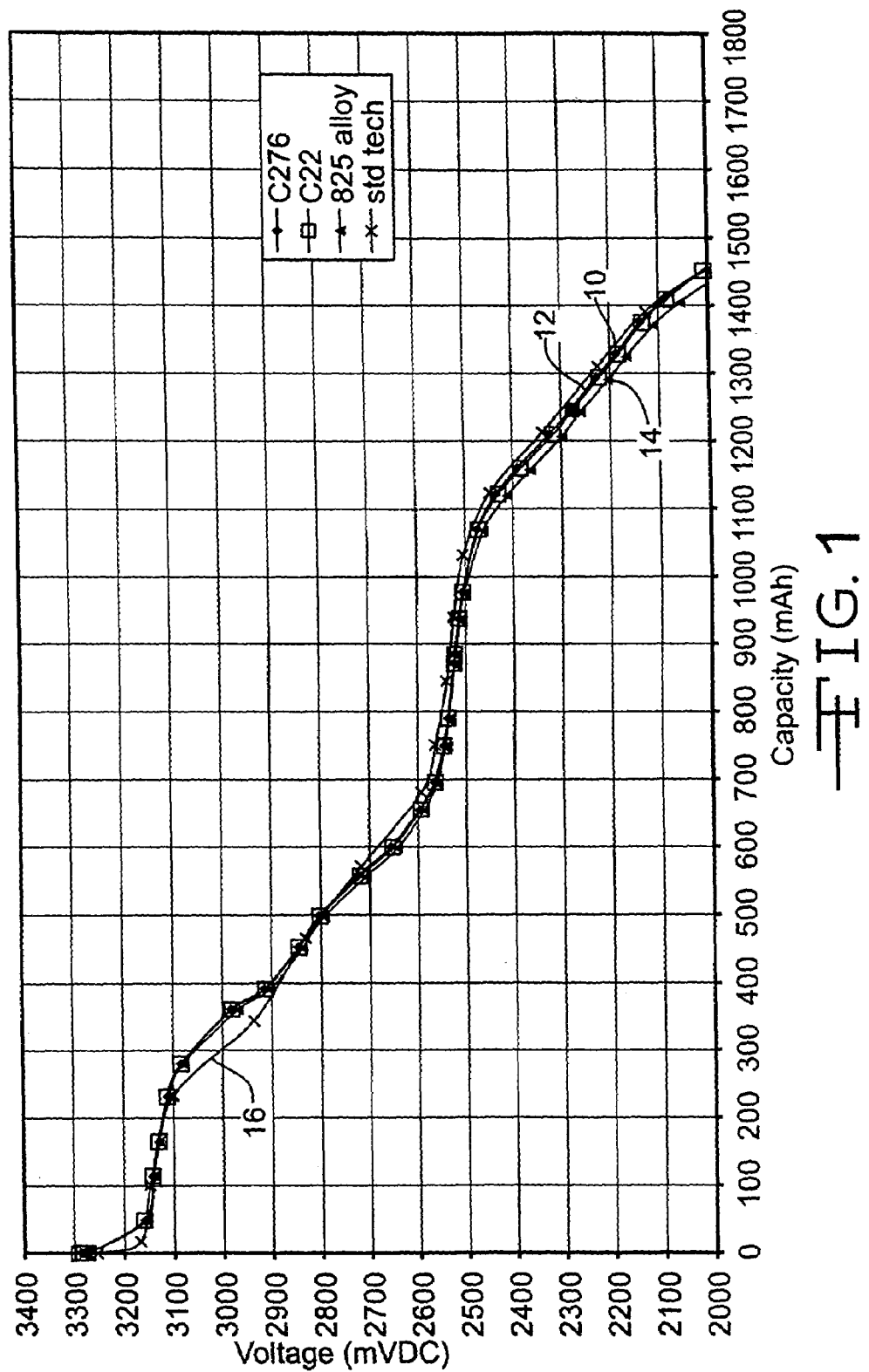
FIG. 1 is a graph of the average voltage (mVdc) vs. capacity (mAh) of various nickel alloys as cathodic current collectors in lithium/silver vanadium oxide (Li/SVO) cells activated with an electrolyte of 1M LiPF$_6$ dissolved in a 50:50 by volume mixture of propylene carbonate and dimethoxyethane.

A preferred composition range for the nickel-based alloys of the present invention comprises, by weight percent:

a) at least about 23% nickel;
b) 5% or more molybdenum; and
c) 20% or more of a combination of chromium and molybdenum.

It is important to note that the use of the term "nickel-based alloys" is not meant to imply that nickel must be the largest constituent in all alloys meeting the compositional requirements of the present invention. Instead, the nickel content provides a "base" of corrosion resistance that is greatly augmented by the presence of chromium and/or molybdenum. In that respect, by weight, nickel comprises up to about 65% of the alloy, chromium comprises up to about 24% of the alloy, and molybdenum comprises up to about 17% of the alloy. Chromium and molybdenum are known to have a powerful effect on the protective ability of the passive layer that forms on these nickel alloys. However, when nickel is the greatest constituent of the alloy composition, then the corrosion resistance is acceptable.

Nickel-based alloys according to the present invention further comprise, by weight, 0 to 50% iron, 0 to 5% tungsten, 0 to 5% cobalt, 0 to 1% carbon, 0 to 3% copper, 0 to 3% manganese, and minor amounts of at least one element selected from the group consisting of silicon, phosphorus, sulfur, titanium, aluminum, tantalum, zirconium, lanthanum, boron, beryllium, and mixtures thereof. As used herein, the term "minor" means an amount of an alloy constituent less than about 3%, by weight.

Table 1 contains a summary of the elemental composition of commercially available nickel-based alloys according to the present invention. In individual heats of these alloys, the actual percentage content of each listed element may range around the values given.

TABLE 1

| Sample | Ni | Cr | Mo | Fe | W | Co | Cu | Mn | Total |
|---|---|---|---|---|---|---|---|---|---|
| 625 (UNS N06625) | 61 | 23 | 10 | 5 | | | | | 99 |
| C22(UNS (N06022) | 59.5 | 22 | 13 | 3 | | 2.5 | | | 100 |
| 622 (UNS N06022 | 58 | 20 | 14 | 5 | 3 | | | | 100 |
| 686 (UNS N06686) | 57.63 | 20.48 | 16.38 | 1.04 | 3.88 | | | | 99.41 |
| C276 (UNS N10276) | 56 | 16 | 16 | 6 | 4 | 1 | | 1 | 100 |
| 25-6Mo (UNS N08926) | 25 | 20 | 7 | 47 | | | 1 | | 100 |

Elements less than 1% not listed.

Table 2 contains a summary of the elemental composition of commercially available nickel-based alloys that are not acceptable according to the present invention.

TABLE 2

| Sample | Ni | Cr | Mo | Fe | Cu | Total |
|---|---|---|---|---|---|---|
| 200 nickel (UNS N02200) | 100 | | | | | 100 |
| 600 alloy (UNS N06600) | 76 | 15 | | 8 | | 99 |
| 825 (UNS N08825) | 42 | 21.5 | 3 | 30 | 2 | 98.5 |

Elements less than 1% not listed.

Thus, the "base" may be comprised of, by weight, nickel in the amount of at least about 23%. The remainder of the alloy formulation comprises, by weight, at least about 20% of a combination of chromium and molybdenum, or at least about 5% molybdenum. At these levels of alloy enrichment, the goal of enhanced corrosion resistance in all its presently relevant forms is reached. The preferred amounts of chromium, and/or molybdenum confer on the alloys a high degree of resistance to pitting and crevice corrosion in the presence of nonaqueous electrolytes activating cathode active materials typically coupled with alkali metal anode active materials, whether in a primary or a secondary electrochemical configuration. This is especially the case at elevated temperatures above about 72° C. Nitrogen and other elements present in minor amounts can also be beneficial to corrosion resistance.

Nickel-based alloys of the present invention may be formed from conventional wrought metal stock in sheet or foil form by any applicable chemical or mechanical means. Current collectors can thus be made in the form of a metal sheet without holes, or in the form of screens produced by etching/chemical milling, by mechanical perforation with or without expansion after perforation, or by other means. As an alternative to wrought metal stock, sheet or foil stock made by powder metallurgy techniques can be the starting material, or complete current collectors can be produced in final form by powder metallurgy.

Accordingly, the positive electrode current collector material of the present invention is useful in electrochemical cells having either a primary configuration with a positive electrode of either a solid cathode active material or a liquid catholyte/carbonaceous material supported on the nickel-based current collector, or a secondary cell configuration. Regardless of the cell configuration, such cells preferably comprise an anode active material of a metal selected from Groups IA, IIA and IIIB of the Periodic Table of the Elements. This includes the alkali metals lithium, sodium, potassium, etc., and their alloys and intermetallic compounds including, for example, Li—Si, Li—Al, Li—B and Li—Si—B alloys and intermetallic compounds. The preferred anode active material comprises lithium. More preferred is a lithium alloy such as a lithium-aluminum alloy. However, the greater the amounts of aluminum present by weight in the alloy, the lower the energy density of the cell.

In a primary cell, the form of the anode may vary, but preferably the anode is a thin metal sheet or foil of the anode active metal, pressed or rolled on a metallic anode current collector, i.e., preferably comprising nickel, to form an anode component. The anode component has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface area cell design.

The positive electrode or cathode of the present electrochemical cell is preferably of carbonaceous materials such as graphite, carbon and fluorinated carbon. Such carbonaceous materials are useful in both liquid catholyte and solid cathode primary cells and in rechargeable, secondary cells. The positive electrode more preferably comprises a fluorinated carbon represented by the formula $(CF_x)_n$ wherein x varies between about 0.1 to 1.9 and preferably between about 0.5 and 1.2 and $(C_2F)_n$ wherein the n refers to the number of monomer units, which can vary widely. These electrode active materials are composed of carbon and fluorine, and include graphitic and nongraphitic forms of carbon, such as coke, charcoal or activated carbon.

Other cathode active materials useful for constructing an electrochemical cell according to the present invention are selected from a metal, a metal oxide, a metal sulfide or a mixed metal oxide. Such electrode active materials include silver vanadium oxide (SVO), copper silver vanadium oxide, manganese dioxide, titanium disulfide, copper oxide, copper sulfide, iron sulfide, iron disulfide, cobalt oxide, nickel oxide, copper vanadium oxide, and combinations thereof.

In secondary cells, the positive electrode preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCO_{1-x}Ni_xO_2$.

To discharge such secondary cells, the lithium metal comprising the positive electrode is intercalated into a carbonaceous negative electrode or anode by applying an externally generated electrical potential to recharge the cell. The applied recharging electrical potential draws the alkali metal from the cathode material, through the electrolyte and into the carbonaceous anode to saturate the carbon comprising the anode. The cell is then provided with an electrical potential and discharged in a normal manner.

An alternate secondary cell construction comprises intercalating the carbonaceous material with the active alkali material before the negative electrode is incorporated into the cell. In this case, the positive electrode body can be solid and comprise, but not be limited to, such materials as manganese dioxide, silver vanadium oxide, titanium disulfide, copper oxide, copper sulfide, iron sulfide, iron disulfide and fluorinated carbon. However, this approach may be compromised by problems associated with handling lithiated carbon outside of the cell. Lithiated carbon tends to react when contacted by air or water.

The positive electrode for a primary or a secondary cell is prepared by mixing about 80 to about 99 weight percent of an already prepared electrode active material in a finely divided form with up to about 10 weight percent of a binder material, preferably a thermoplastic polymeric binder material. The term thermoplastic polymeric binder material is used in its broad sense and any polymeric material, preferably in a powdered form, which is inert in the cell and which passes through a thermoplastic state, whether or not it finally sets or cures, is included within the meaning "thermoplastic polymer". Representative materials include polyethylene, polypropylene and fluoropolymers such as fluorinated ethylene and propylene, polyvinylidene fluoride (PVDF), polyethylenetetrafluoroethylene (ETFE), and polytetrafluoroethylene (PTFE), the latter material being most preferred. Natural rubbers are also useful as the binder material with the present invention.

In the case of a primary, solid cathode electrochemical cell, the cathode active material is further combined with up to about 5 weight percent of a discharge promoter diluent such as acetylene black, carbon black and/or graphite. A preferred carbonaceous diluent is Shawinigan® acetylene black carbon. Metallic powders such as nickel, aluminum, titanium and stainless steel in powder form are also useful as conductive diluents.

If the active material is a carbonaceous counter electrode in a secondary cell, the electrode material preferably includes a conductive diluent and a binder material in a similar manner as the previously described primary, solid cathode electrochemical cell.

The thusly-prepared cathode active admixture may be formed into a freestanding sheet prior to being contacted to a conductive positive current collector of a nickel-based alloy according to the present invention to form the positive electrode. The manner of preparing the freestanding sheet is thoroughly described in U.S. Pat. No. 5,435,874 to Takeuchi et al. This patent is assigned to the assignee of the present and incorporated herein by reference. Rolling, spreading or pressing the cathode active admixture onto a nickel-based alloy current collector may also prepare cathode components for incorporation into a cell. Cathodes prepared as described above are flexible and may be in the form of one or more plates operatively associated with at least one or more plates of anode material, or in the form of a strip wound with a corresponding strip of anode material in a structure similar to a "jellyroll".

Whether the cell is constructed as a primary or secondary electrochemical system, the cell includes a separator to provide physical segregation between the anode and cathode electrodes. The separator is of electrically insulative material, and the separator material also is chemically unreactive with and insoluble in the electrolyte. In addition, the separator material has a degree of porosity sufficient to allow flow there through of the electrolyte during the electrochemical reaction of the cell. Illustrative materials include fabrics woven from fluoropolymeric fibers of polyethylenetetrafluoroethylene and polyethylenechlorotrifluoroethylene used either alone or laminated with a fluoropolymeric microporous film. Other suitable separator materials include non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C.H. Dexter, Div., Dexter Corp.).

The electrochemical cell further includes a nonaqueous, ionically conductive electrolyte as a medium for migration of ions between the anode and the cathode electrodes during electrochemical reactions of the cell. Suitable nonaqueous electrolytes useful for activating both primary and secondary cells having an electrode couple of alkali metal or an alkali metal-containing material, and a solid active material counter electrode preferably comprise a combination of a lithium salt and an organic solvent system. More preferably, the electrolyte includes an ionizable alkali metal salt dissolved in an aprotic organic solvent or a mixture of solvents comprising a low viscosity solvent and a high permittivity solvent. The inorganic, ionically conductive salt serves as the vehicle for migration of the alkali metal ions to intercalate into the counter electrode and is similar to the alkali metal comprising the anode active material. Suitable salts include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof. Suitable salt concentrations typically range between about 0.8 to 1.5 molar.

In electrochemical systems having a solid cathode or in secondary cells, the nonaqueous solvent system comprises low viscosity solvents including tetrahydrofuran (THF), methyl acetate (MA), diglyme, trigylme, tetragylme, dimethyl carbonate (DMC), ethyl methyl carbonate (EMC), 1,2-dimethoxyethane (DME), diisopropylether, 1,2-diethoxyethane, 1-ethoxy, 2-methoxyethane, dipropyl carbonate, methyl propyl carbonate, ethyl propyl carbonate, diethyl carbonate, and mixtures thereof. While not necessary, the electrolyte also preferably includes a high permittivity solvent selected from cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-butyrolactone (GBL), γ-valerolactone, N-methyl-pyrrolidinone (NMP), and mixtures thereof. For a solid cathode primary or secondary cell having lithium as the anode active material, the preferred electrolyte is $LiAsF_6$ in a 50:50, by volume, mixture of PC/DME. For a $Li/CF_x$ cell, the preferred electrolyte is 1.0M to 1.4M $LiBF_4$ in GBL.

The preferred form of a primary alkali metal/solid cathode electrochemical cell is a case-negative design wherein the anode is in contact with a conductive metal casing and the cathode contacted to the nickel-based current collector is the positive terminal. In a secondary electrochemical cell having a case-negative configuration, the anode (counter electrode)/cathode couple is inserted into the conductive metal casing such that the casing is connected to the carbonaceous counter electrode current collector, and the lithiated material is contacted to a second current collector. In either case, the current collector for the lithiated material or the cathode electrode is in contact with the positive terminal pin via a lead of the same material as the current collector. The lead is welded to both the current collector and the positive terminal pin, which can also be the present nickel-based alloy material, for electrical contact.

A preferred material for the casing is titanium although stainless steel, mild steel, nickel-plated mild steel and aluminum are also suitable. The casing header comprises a metallic lid having an opening to accommodate the glass-to-metal seal/terminal pin feedthrough for the cathode electrode. The anode electrode or counter electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a titanium plug over the fill hole, but not limited thereto. The cell of the present invention can also be constructed in a case-positive design.

The electrochemical cell of the present invention comprising the nickel-based alloy as the positive electrode current collector operates in the following manner. When the ionically conductive electrolytic solution becomes operatively associated with the anode and the cathode, an electrical potential difference is developed between terminals operatively connected to the anode and the cathode. The electrochemical reaction at the anode includes oxidation to form metal ions during cell discharge. The electrochemical reaction at the cathode involves intercalation or insertion of ions that migrate from the anode to the cathode and conversion of those ions into atomic or molecular forms.

The following examples describe the manner and process of manufacturing and discharging an electrochemical cell comprising a cathode having a nickel-based alloy current collector according to the present invention, and they set forth the best mode contemplated by the inventors of carrying out the invention, but they are not to be construed as limiting.

EXAMPLE I

Three groups of three test cells were manufactured, each containing a single cathode plate comprised of SVO mix pressed to various nickel alloy current collectors, i.e., C22, C276, and 825, respectively. A molybdenum terminal pin was welded to the cathode current collector. The terminal pin was part of a hermetic feedthrough assembly, i.e., a header. An anode butterfly assembly consisting of a 200 series nickel current collector having lithium pressed to each screen was used in the test cells. The butterfly anode screens were folded down and into contact with the opposed major faces of the cathode. A thin polypropylene film laminate served as the separator between the anode and cathode. The resulting electrode assembly was inserted into a prismatic stainless steel case with the anode current collector welded thereto in a case negative design. The electrode assembly was activated with an electrolyte of 1.2M $LiPF_6$ in a 50:50 by volume mixture of PC/DME after the header assembly was welded to the cell case. For a more detailed discussion of such a cell design reference is made to U.S. Pat. No. 5,250,373 to Muffoletto et al., which is assigned to the assignee of the present invention and incorporated herein by reference.

Table 3 exhibits information collected on these Li/SVO cells burned-in for 9 hours under a 2.49-kohm load at 37° C. and then stored 2 years at that temperature under open circuit conditions. The last loaded voltage under the burn-in regime as recorded at beginning of life is listed. Also listed is the open circuit potential and pulse minima voltage data for the cells recorded at 37° C. following the 2-year open circuit period. The cells were then pulse discharged using a 20 mA, four pulse train during which the pulse current was applied for 10 seconds with a 15 second rest between pulses. The cells were allowed to sit for one week after the pulse train, then discharged under a 4.53 kohm load. None of the cells exhibited a potential below 2.974 V under this test regime.

Figure 2:
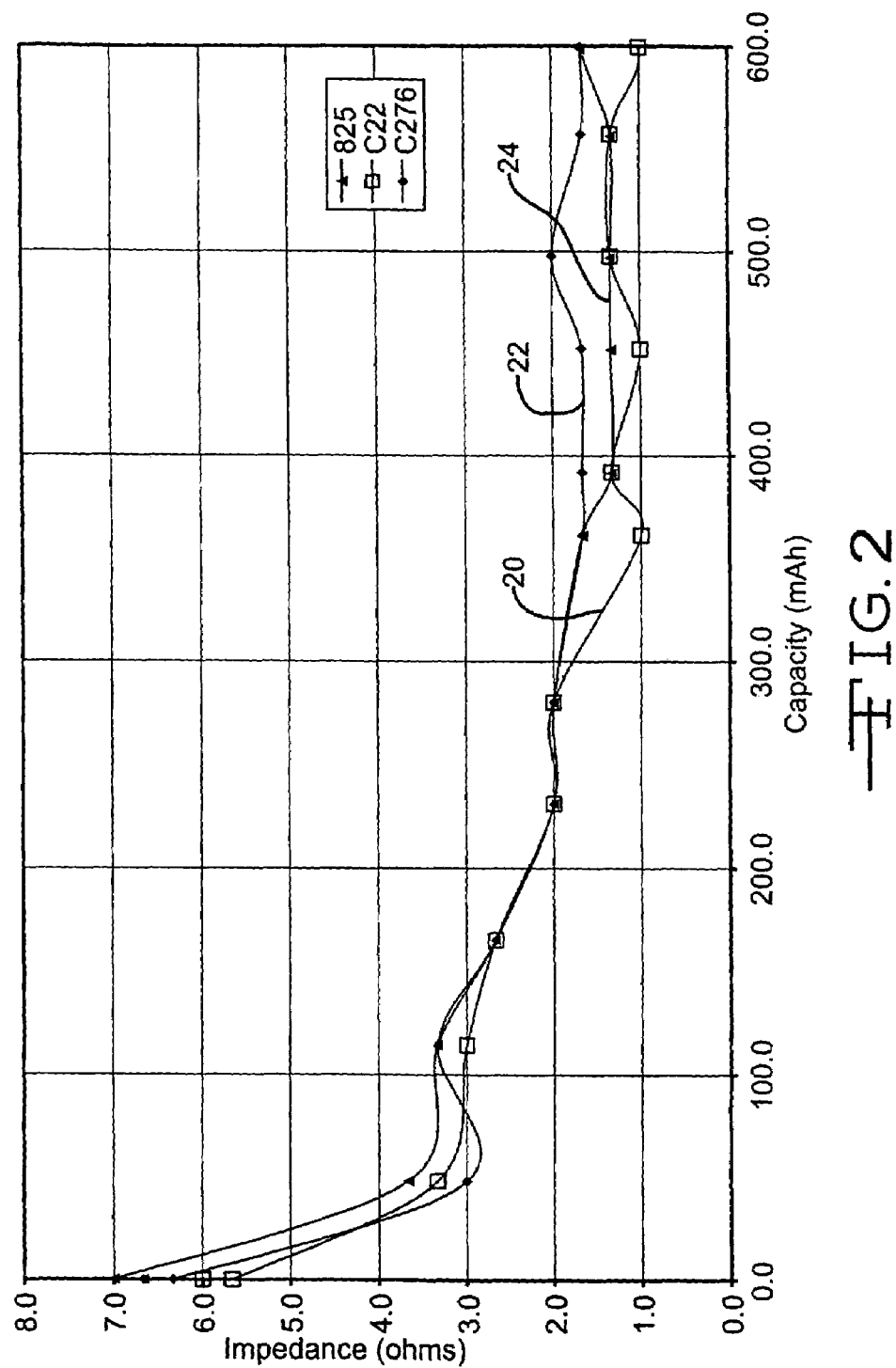
FIG. 2 is a graph (impedance, ohms vs. capacity) of nickel alloys as cathodic current collectors in the cells used to construct FIG. 1.
Figure 4A:
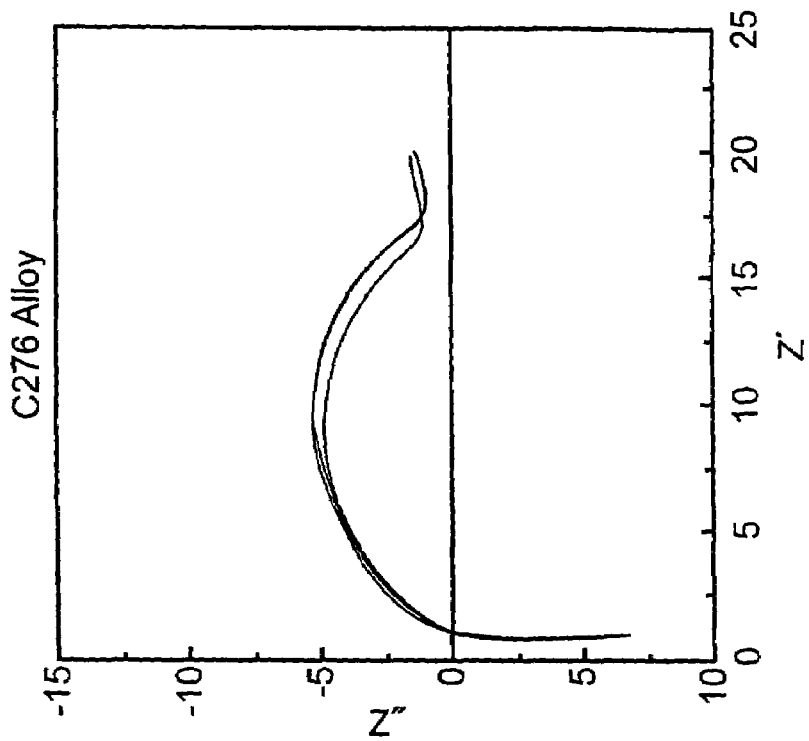
Figure 4B:
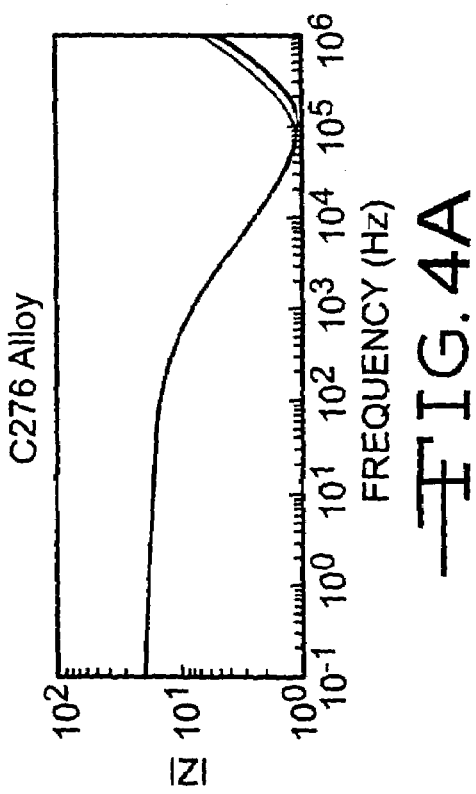
Figure 4C:
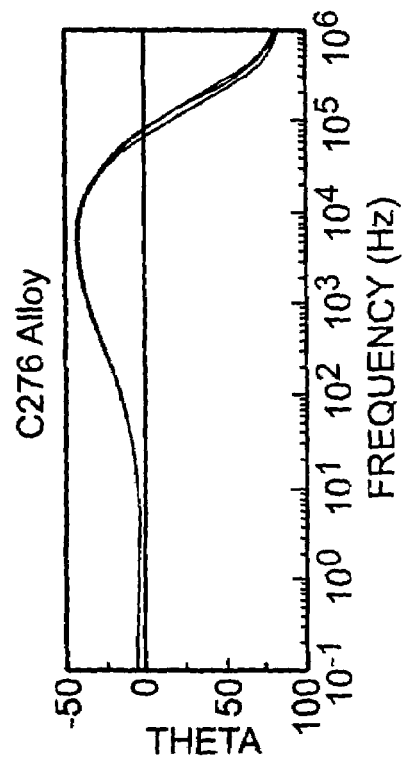
Figure 6A:
FIGS. 6A to 14B display the unexposed and exposed surfaces of the materials listed in Table 4.
Figure 6B:
Figure 7A:
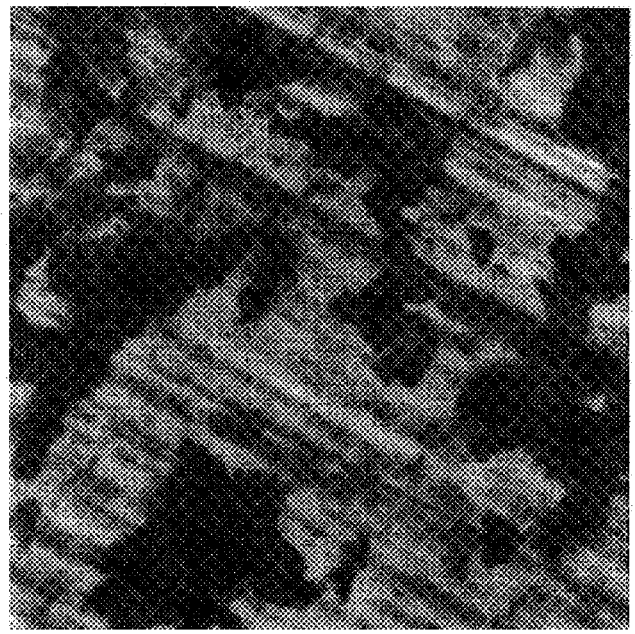
Figure 7B:
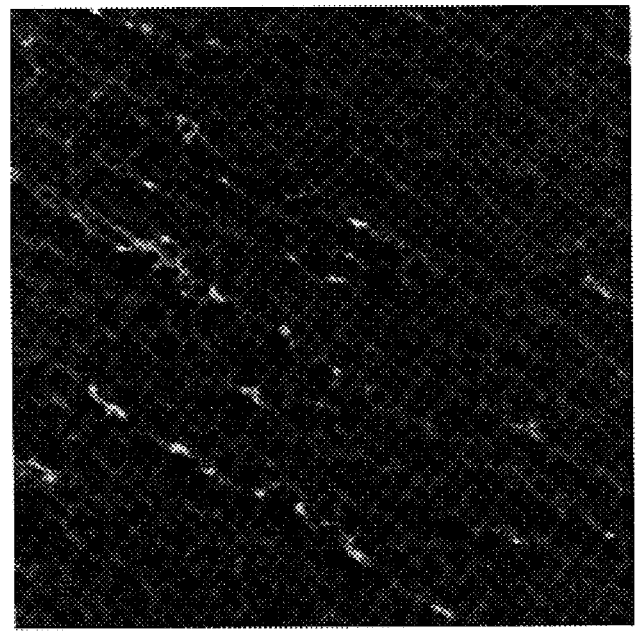
Figure 8A:
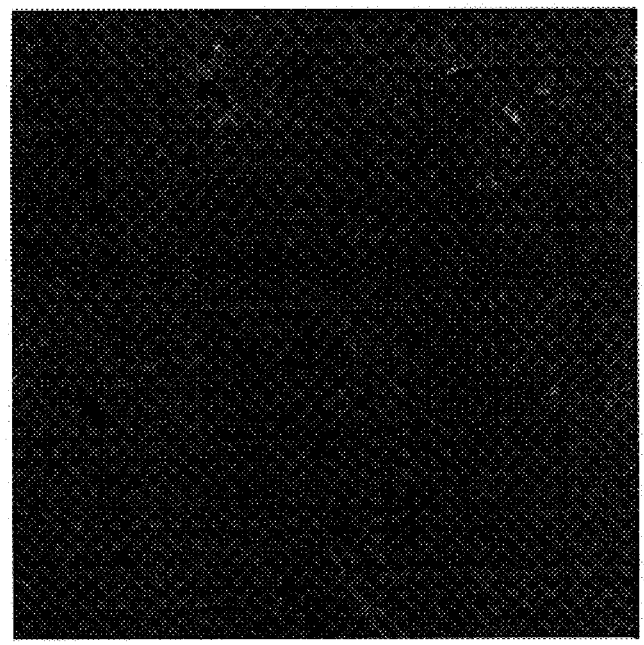
Figure 8B:
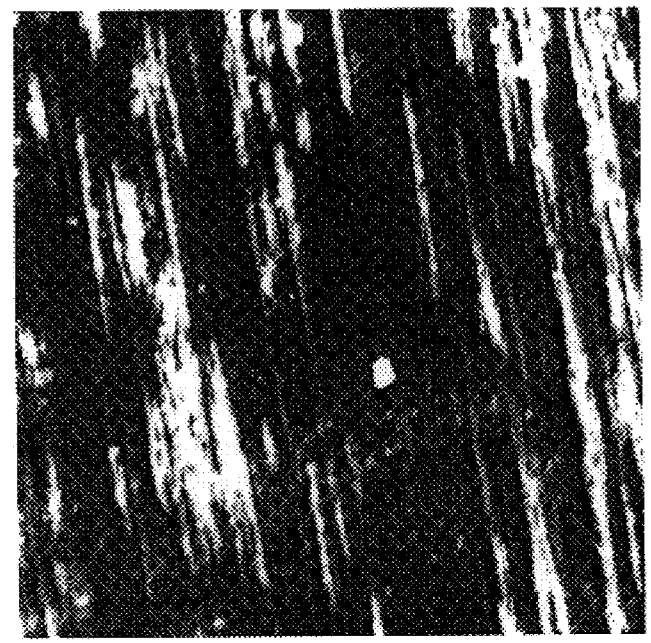
Figure 9A:
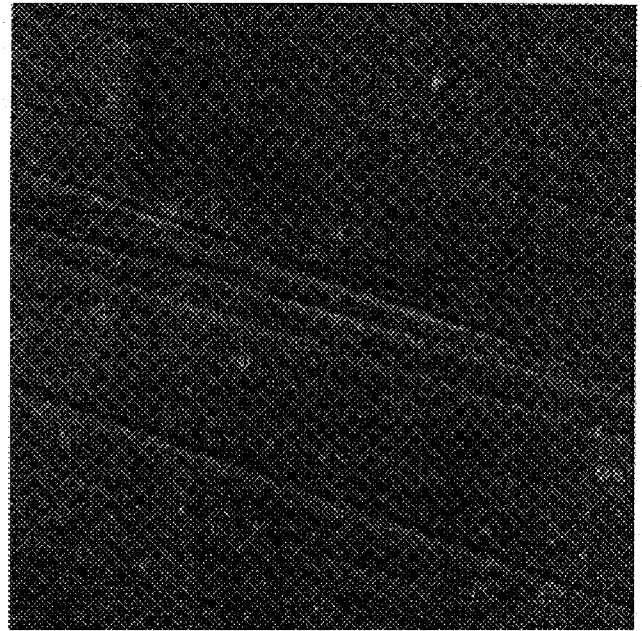
Figure 9B:
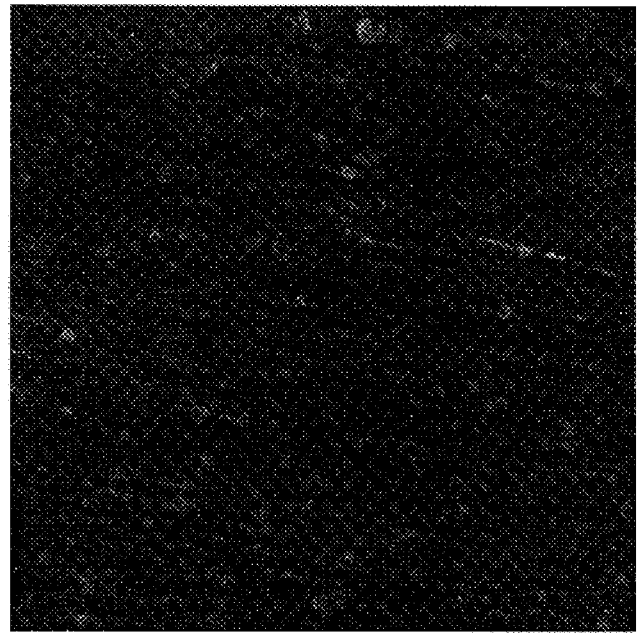
Figure 10A:
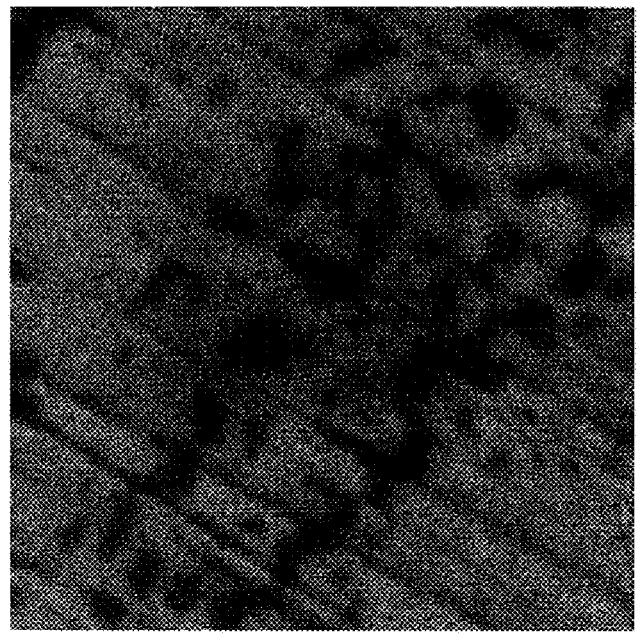
Figure 10B:
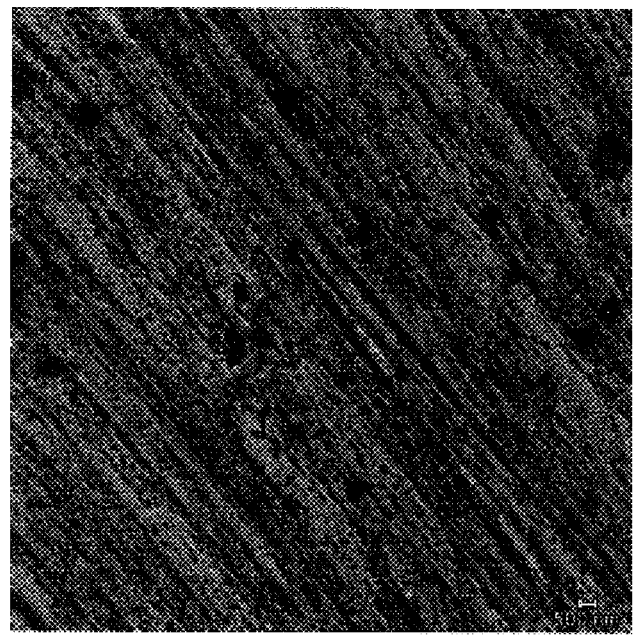
Figure 11A:
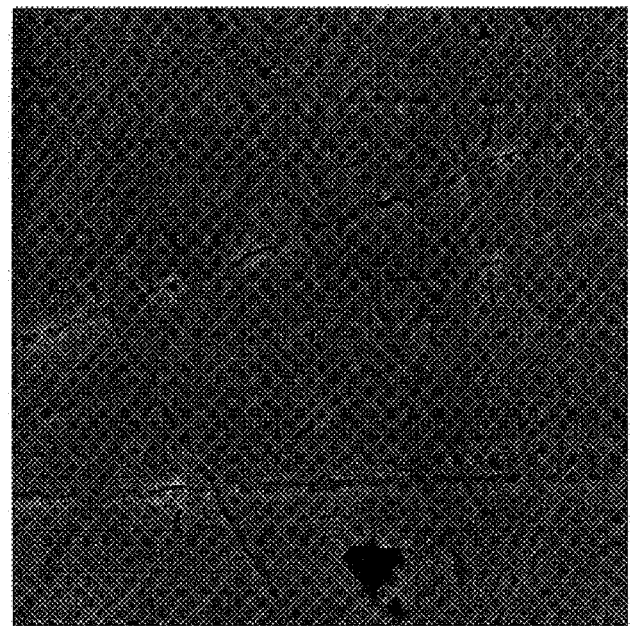
Figure 11B:
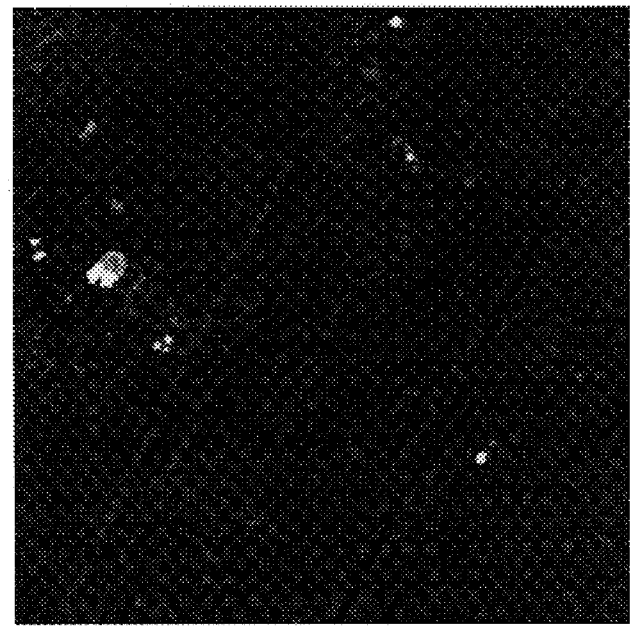
Figure 12A:
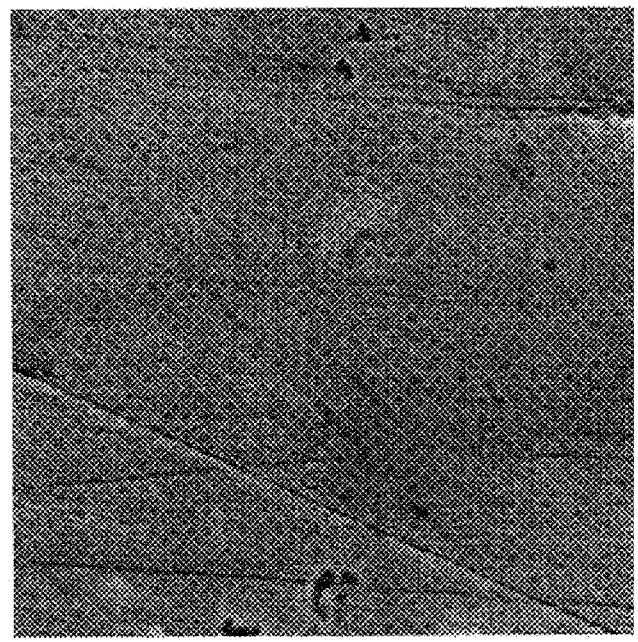
Figure 12B:
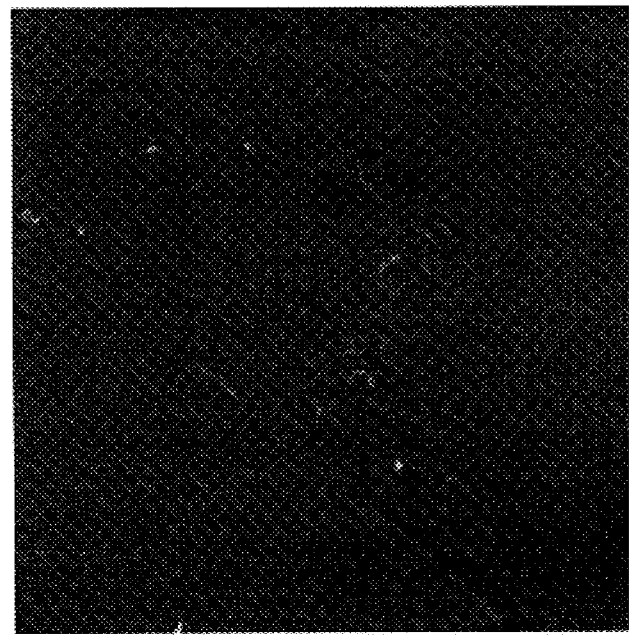
Figure 13A:
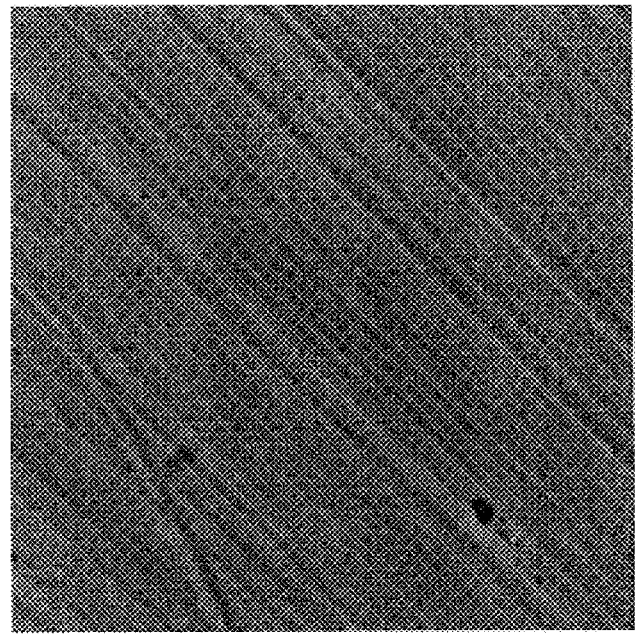
Figure 13B:
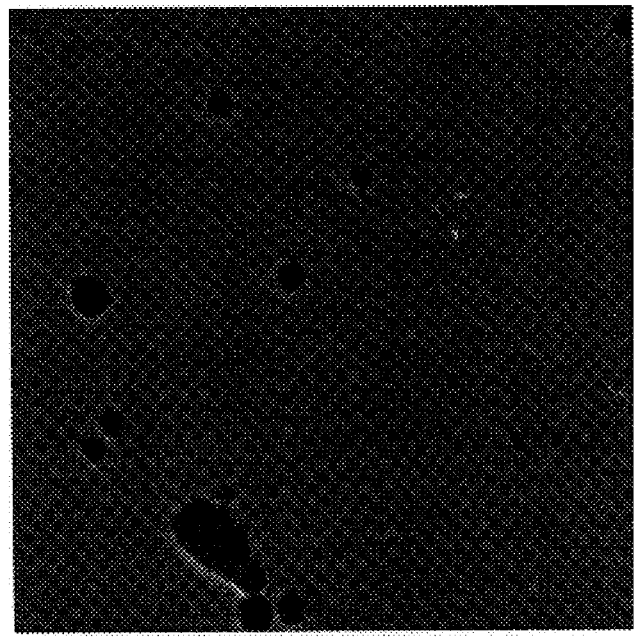
Figure 14A:
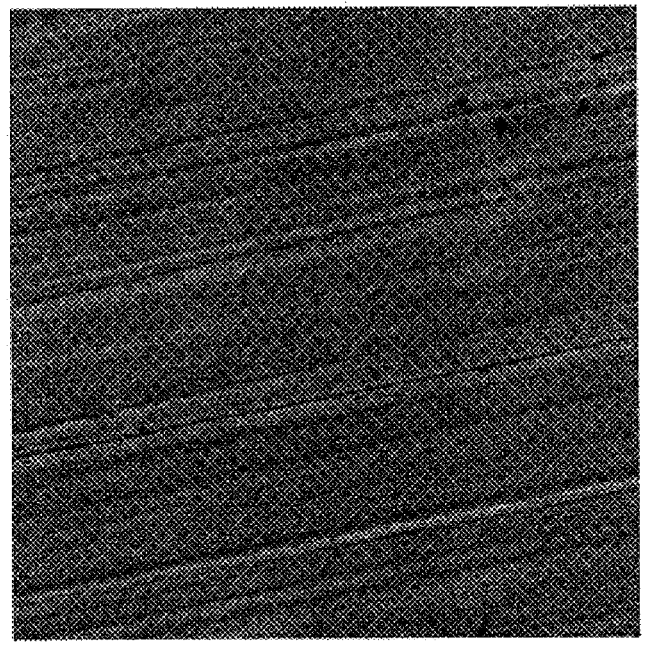
Figure 14B:
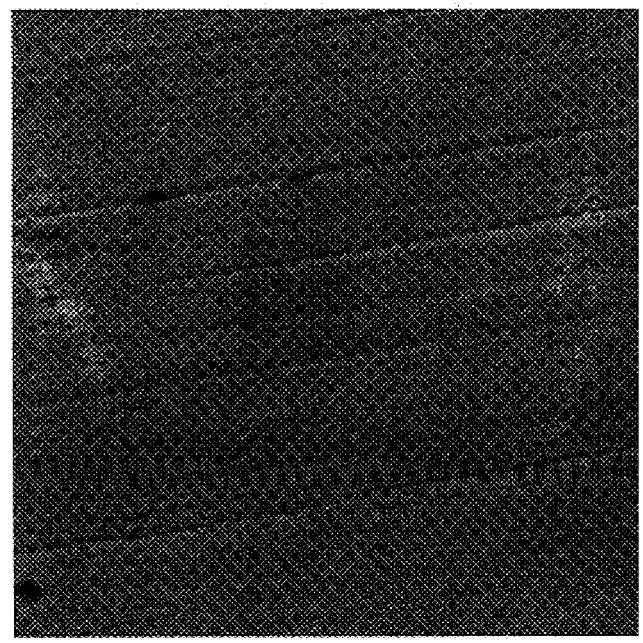

FIGS. 1 and 2 were constructed from the average discharge of such cells under a 4.53-kohm constant resistive load. In FIG. 1, curve 10 was generated from the average discharge of the three cells containing a cathode current collector of C22, curve 12 was generated from the average discharge of the three cells containing C276 and curve 14 was generated from the average discharge of the three cells containing a cathode current collector of 825 alloy. Curve 16 is from the average discharge of twelve standard technology cells containing titanium cathode current collectors and activated with an electrolyte of 1M $LiPF_6$ in a 50:50 by volume mixture of PC/DME. In FIG. 2, curves 20, 22 and 24 were constructed from the average impedance vs. capacity of the respective present invention cells graphed in FIG. 1.

From these graphs, it is concluded that the C276, C22 and 825 alloy materials are equivalent to standard technology Li/SVO cells. This indicates that the nickel-alloys of the present invention provide high corrosion resistance in the presence of fluorinated active materials.

tamination on their exposed surfaces. They were then incorporated into an electrolytic cell comprising 1.0M $LiBF_4$ dissolved in γ-butyrolactone (GBL). The cell had a lithium reference electrode and a platinum counter electrode. The test method conformed to ASTM method G5-82 entitled "Standard Reference Test Method for Making Potentiodynamic Anodic Polarization Measurements." It should be noted that this electrolyte is typically used to activate a $Li/CF_x$ cell.

Polarization characteristics of the exposed materials were obtained by plotting the current density ($\mu A/cm^2$) as a function of the applied potential (E vs. Li (V)) using log current functions versus a potential semi-log chart. The uniform corrosion rates of the eight materials listed in Table 4 were calculated at 3.25V. All uniform corrosion rates (@3.25V vs Li) were less than 0.5 mills per year (mpy).

TABLE 3

| Serial number | Current Collector Material | Final CCV @ BI under 2.49 kΩ (V) | OCV @ 37° C. after 2 yrs (V) | P1 min (V) | P1 end (V) | P4 min (V) | P4 avg (V) |
| --- | --- | --- | --- | --- | --- | --- | --- |
| 110193 | C22 (UNS (N06022) | 3.164 | 3.286 | 3.059 | 3.059 | 3.066 | 3.072 |
| 110194 | C22 (UNS (N06022) | 3.163 | 3.284 | 3.071 | 3.074 | 3.081 | 3.088 |
| 110195 | C22 (UNS (N06022) | 3.164 | 3.286 | 3.049 | 3.049 | 3.066 | 3.071 |
| 110163 | C276 (UNS N10276) | 3.165 | 3.286 | 3.052 | 3.054 | 3.074 | 3.080 |
| 110164 | C276 (UNS N10276) | 3.163 | 3.284 | 3.052 | 3.054 | 3.074 | 3.084 |
| 110165 | C276 (UNS N10276) | 3.164 | 3.286 | 3.052 | 3.052 | 3.062 | 3.067 |
| 110313 | 825 (UNS N08825) | 3.163 | 3.289 | 2.988 | 2.988 | 2.974 | 2.981 |
| 110314 | 825 (UNS N08825) | 3.163 | 3.291 | 3.013 | 3.013 | 3.000 | 3.008 |
| 110315 | 825 (UNS N08825) | 3.164 | 3.291 | 2.996 | 2.996 | 2.981 | 2.989 |

EXAMPLE II

FIGS. 3A to 5C present the Electrochemical Impedance Spectra (EIS) recorded under open circuit conditions at ambient temperatures for Li/SVO cells constructed in the same manner as those cells used in Example I, except they were activated with an electrolyte composed of 1M $LiPF_6$ in a 50:50 by volume mixture of PC/DME. The cells were stored under open circuit conditions at 37° C. for two years after having been pre-discharged under a 2.49-kΩ load for 21 hours. In particular, FIGS. 3A to 3C are the EIS spectra for the three cells having C22 alloy as the cathode current collector, FIGS. 4A to 4C are the EIS spectra for the three cells having C276 alloy as the cathode current collector and FIGS. 5A to 5C are the EIS spectra for the three cells having 825 alloy as the cathode current collector.

The impedance plots for the cells containing the indicated nickel-based alloys show very little variation in internal cell impedance among samples of the same material. The conclusion from the EIS spectra is that no cell appears to have developed a significant increase in internal impedance, even after storage under open circuit conditions at 37° C. for 2 years.

EXAMPLE III

The materials listed in the previously presented Tables 1 and 2 were subjected to cyclic polarization testing at room temperature. This was done as a qualitative technique to assess the alloy material's behavior in an electrolytic solution when scanned at a rate of 0.5 mV/s from 2V to 5V. First, 800 grit sandpaper was used to remove any oxide or other con-

TABLE 4

| Sample/Run # | Corr. Rate @ I = 3.25 V (mpy) |
| --- | --- |
| 625 | 0.181 |
| C22 | 0.156 |
| 622 | 0.271 |
| 686 (4006) | 0.214 |
| C276 | 0.122 |
| 25-6 Mo | 0.117 |
| 200 nickel | 0.410 |
| 600 alloy | 0.251 |
| 825 | 0.284 |

Scanning electron microscope examination of the nine alloys subjected to the cyclic polarization testing in 1.0M $LiBF_4$/GBL electrolyte indicate that for the nickel alloys, the molybdenum level is crucial to corrosion resistance. FIGS. 6A to 14B display the unexposed and exposed surfaces of the materials listed in Table 4. Only the 600 alloy (FIG. 7B) and 825 alloy (FIG. 13B) exhibited pitting corrosion. These alloys (excluding commercially pure 200 series nickel) have the lowest weight percentages of molybdenum, and were previously described with respect to Table 2 as being unacceptable for the present invention. Pure 200 series nickel had the highest uniform corrosion noted. Based on this data, localized corrosion in nonaqueous environments of nickel-based alloys is inhibited by having at least about 23% nickel and either at least about 5% molybdenum or a combination of molybdenum and chromium of at least about 20%.

It is appreciated that various modifications to the inventive concepts described herein may be apparent to those skilled in the art without departing from the spirit and scope of the present invention as defined by the hereinafter appended claims.

What is claimed is:

1. A current collector for use in an electrical energy storage device, the current collector is an alloy comprising, by weight:
   a) at least about 23% nickel;
   b) greater than 8% to about 17% molybdenum;
   c) greater than about 30% of a combination of chromium and molybdenum;
   d) from zero to about 5% cobalt; and
   e) greater than zero to about 50% iron.

2. The current collector of claim 1 wherein the alloy further comprises, by weight, 0 to 5% tungsten, 0 to 1% carbon, 0 to 3% copper, 0 to 3% manganese, and minor amounts of at least one element selected from the group consisting of silicon, phosphorus, sulfur, titanium, aluminum, tantalum, zirconium, lanthanum, boron, beryllium, and mixtures thereof.

3. The current collector of claim 1 wherein nickel comprises, by weight, up to about 65% of the alloy.

4. The current collector of claim 1 wherein chromium comprises, by weight, up to about 24% of the alloy.

5. A current collector for use in an electrical energy storage device, the current collector of an alloy comprising, by weight:
   a) at least about 23% to about 65% nickel;
   b) about 15% to about 24% chromium;
   c) greater than 8% to about 17% molybdenum;
   d) greater than 0% to about 50% iron;
   e) about 0% to about 5% for each element selected from the group consisting of tungsten, cobalt, carbon, copper, manganese, silicon, phosphorus, sulfur, titanium, aluminum, tantalum, zirconium, lanthanum, boron, beryllium, and mixtures there of; and
   f) wherein the alloy contains at least about 30% of a combination of chromium and molybdenum.

6. An electrochemical cell, which comprises:
   a) an anode;
   b) a counter electrode comprising at least one electrode active material supported on a current collector, wherein, by weight, the current collector is an alloy comprising:
      i) at least about 23% nickel;
      ii) greater than 8% to about 17% molybdenum;
      iii) greater than about 30% of a combination of chromium and molybdenum;
      iv) from zero to about 5% cobalt; and
      v) greater than zero to about 50% iron; and
   c) an electrolyte activating the anode and the counter electrode.

7. The electrochemical cell of claim 6 wherein nickel comprises, by weight, up to about 65% of the alloy.

8. The electrochemical cell of claim 6 wherein chromium comprises, by weight, up to about 24% of the alloy.

9. The electrochemical cell of claim 6 wherein the alloy further comprises, by weight, 0 to 5% tungsten, 0 to 1% carbon, 0 to 3% copper, 0 to 3% manganese, and minor amounts of at least one element selected from the group consisting of silicon, phosphorus, sulfur, titanium, aluminum, tantalum, zirconium, lanthanum, boron, beryllium, and mixtures thereof.

10. The electrochemical cell of claim 6 wherein the anode is lithium and the electrode active material of the counter electrode is fluorinated carbon.

11. The electrochemical cell of claim 6 wherein the anode material is lithium and the electrode active material of the counter electrode is selected from the group consisting of silver vanadium oxide, copper silver vanadium oxide, manganese dioxide, titanium disulfide, copper oxide, copper sulfide, iron sulfide, iron disulfide, cobalt oxide, nickel oxide, copper vanadium oxide, $LiNiO_2$, $LiMn_2O_4$, $LiCoO_2$, $LiCo_{0.92}Sn_{0.08}O_2$, $LiCo_{1-x}Ni_xO_2$, and combinations thereof.

12. The electrochemical cell of claim 6 wherein the electrolyte comprises a salt selected from the group consisting of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiN(SO_2CF_3)_2$, $LiSCN$, $LiO_3SCF_2CF_3$, $LiC_6F_5So_3$, $LiO_2CCF_3$, $LiSO_3F$, $LiB(C_6H_5)_4$, $LiCF_3SO_3$, and mixtures thereof dissolved in a solvent selected from the group consisting of tetrahydrofuran, methyl acetate, diglyme, trigylme, tetragylme, dimethyl carbonate, ethyl methyl carbonate, 1,2-dimethoxyethane, diisopropylether, 1,2-diethoxyethane, 1ethoxy,2methoxyethane, dipropyl carbonate, methyl propyl carbonate, ethyl propyl carbonate, diethyl carbonate, propylene carbonate, ethylene carbonate, butylene carbonate, acetonitrile, dimethyl sulfoxide, dimethyl formamide, dimethyl acetamide, γ-butyrolactone, γ-valerolactone, N-methyl-pyrrolidinone, and mixtures thereof.

13. A method for providing any electrochemical cell, comprising the steps of:
   a) providing an anode;
   b) providing a counter electrode comprising at least one electrode active material supported on a current collector, wherein, by weight, the current collector is an alloy comprising:
      i) at least about 23% nickel;
      ii) greater than 8% to about 17% molybdenum;
      iii) greater than about 30% of a combination of chromium and molybdenum;
      iv) from zero to about 5% cobalt; and
      v) greater than zero to about 50% iron; and
   c) activating the anode and the counter electrode with an electrolyte.

14. The method of claim 13 including providing the alloy further comprising, by weight, 0 to 5% tungsten, 0 to 1% carbon, 0 to 3% copper, 0 to 3% manganese, and minor amounts of at least one element selected from the group consisting of silicon, phosphorus, sulfur, titanium, aluminum, tantalum, zirconium, lanthanum, boron, beryllium, and mixtures thereof.

15. The method of claim 13 including providing nickel comprising, by weight, up to about 65% of the alloy.

16. The method of claim 13 including providing chromium comprising, by weight, up to about 24% of the alloy.

17. The method of claim 13 including providing the anode material as lithium and selecting the electrode active material of the counter electrode from the group consisting of silver vanadium oxide, copper silver vanadium oxide, manganese dioxide, titanium disulfide, copper oxide, copper sulfide, iron sulfide, iron disulfide, cobalt oxide, nickel oxide, copper vanadium oxide, $LiNiO_2$, $LiMn_2O_4$, $LiCoO_2$, $LiCo_{0.92}Sn_{0.08}O_2$, $LiCo_{1-x}Ni_xO_2$, and combinations thereof.

18. The method of claim 13 including providing the electrolyte comprising a salt selected from the group consisting of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiN(SO_2CF_3)_2$, $LiSCN$, $LiO_3SCF_2CF_3$, $LiC_6F_5So_3$, $LiO_2CCF_3$, $LiSO_3F$, $LiB(C_6H_5)_4$, $LiCF_3SO_3$, and mixtures thereof dissolved in a solvent selected from the group consisting of tetrahydrofuran, methyl acetate, diglyme, trigylme, tetragylme, dimethyl carbonate, ethyl methyl carbonate, 1,2-dimethoxyethane, diisopropylether, 1,2-diethoxyethane, 1-ethoxy,2-methoxyethane, dipropyl carbonate, methyl propyl carbonate, ethyl propyl carbonate, diethyl carbonate, propylene carbonate, ethylene carbonate, butylene carbonate, acetonitrile, dimethyl sulfoxide, dimethyl formamide, dimethyl acetamide, γ-butyrolactone, γ-valerolactone, N-methyl-pyrrolidinone, and mixtures thereof.

* * * * *